United States Patent
Hasegawa

(10) Patent No.: US 6,552,817 B1
(45) Date of Patent: Apr. 22, 2003

(54) IMAGE FORMING APPARATUS

(75) Inventor: Yutaka Hasegawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/366,213

(22) Filed: Aug. 2, 1999

(30) Foreign Application Priority Data

Aug. 14, 1998 (JP) .......... 10-229820
Sep. 30, 1998 (JP) .......... 10-277317

(51) Int. Cl.$^7$ .......... G06K 15/00
(52) U.S. Cl. .......... 358/1.15; 399/383
(58) Field of Search .......... 358/406, 504, 358/1.12, 1.15; 399/383

(56) References Cited

U.S. PATENT DOCUMENTS 5,269,503 A * 12/1993 Hiroi .......... 270/53
5,740,497 A * 4/1998 Yamada et al. .......... 399/87
6,064,842 A * 5/2000 Takeuchi .......... 399/111
6,125,249 A * 9/2000 Ootsuka .......... 399/87

FOREIGN PATENT DOCUMENTS

| JP | 6-64637 | 8/1994 |
| JP | 7-36320 | 2/1995 |
| JP | 8-28655 | 3/1996 |
| JP | 10-91047 | 4/1998 |

* cited by examiner

Primary Examiner—Jerome Grant, II
(74) Attorney, Agent, or Firm—Oblon, Spivak, McClelland, Maier & Neustadt, P.C.

(57) ABSTRACT

An image forming apparatus includes a CPU (Central Processing Unit) for incrementing a mechanical counter in accordance with the count of an electronic counter. For example, when the count of the electronic counter exceeds zero or similar preselected value, the CPU starts incrementing the mechanical counter. Alternatively, after the count of the electronic counter has been restored to zero, the CPU may increment the mechanical counter at the same time as it increments the electronic counter. The two different counters are maintained coincident at all times by simple control.

4 Claims, 3 Drawing Sheets

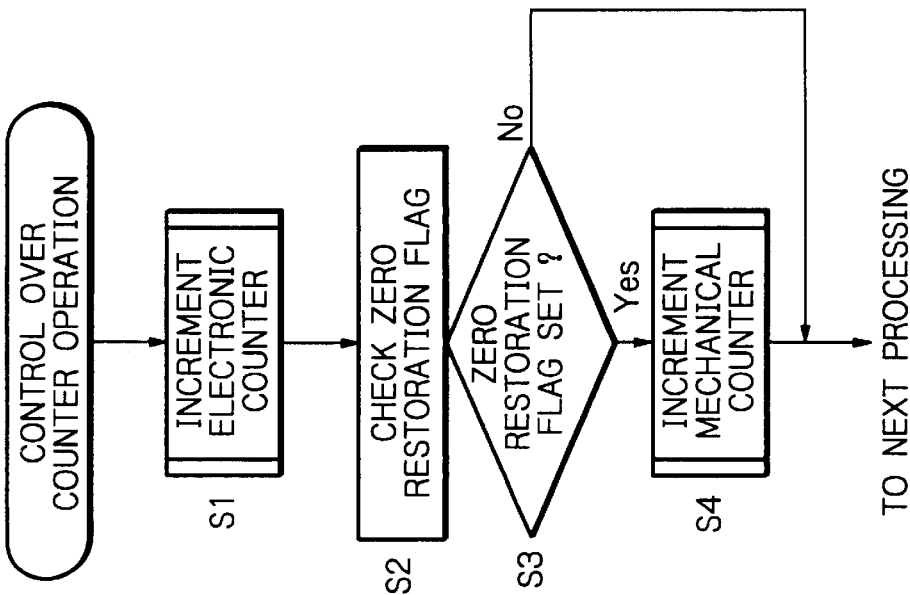
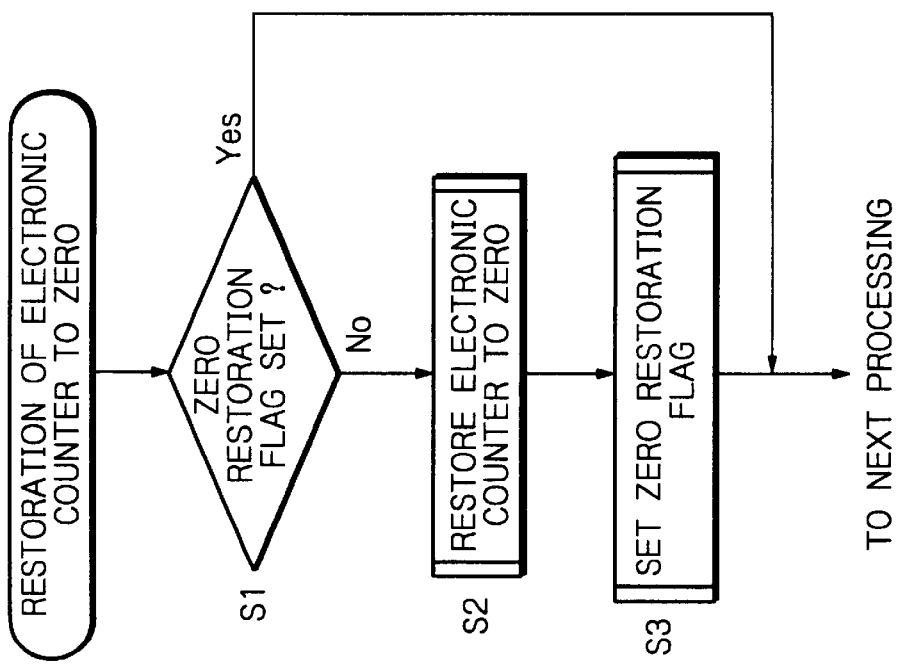

IMAGE FORMING APPARATUS

BACKGROUND OF THE INVENTION

The present invention relates to a printer, copier, facsimile apparatus or similar image forming apparatus and more particularly to an image forming apparatus of the type including a mechanical counter and an electronic counter.

Generally, an image forming apparatus executes an image forming sequence including the feed of a paper or similar recording medium, formation of an image on the paper, and discharge of the paper with the image to the outside of the apparatus. It is a common practice with the image forming apparatus to count consecutive image forming sequences executed or papers with images driven out of the apparatus for calculating a performance charge for, e.g., copies. A mechanical counter has traditionally been used for the above purpose. A current trend in the imaging art is toward the minute classification of the charging system by, e. g., copy mode, increasing the required number of counters for management.

However, it is difficult to increase the number of mechanical counters from the machine cost and mounting standpoint. In light of this, image forming apparatus using electronic counters implemented by NVRAMs (Non-Volatile Random Access Memories) are available on the market.

A problem with the above electronic counter or NVRAM is that data stored therein are apt to change or practically disappear due to, e.g., an electric shock, making the count unidentifiable. Another problem is that the operator cannot see the count of the electronic counter on an operation panel unless the operator turns on a power switch provided on the apparatus. To solve these problems, an electronic counter and a mechanical counter are, in many cases, used in combination. Alternatively, an electronic counter capable of holding the same value as a mechanical counter may be used in combination with the mechanical counter in order to execute processing for obtaining necessary data out of the count.

In an image forming apparatus of the type including both of an electronic counter and a mechanical counter, the counts of the two counters do not have to be coincident before actual counting, i.e., during production, test and adjustment at a factory or during adjustment at the time of delivery. However, the count of the electronic counter and that of the mechanical counter must be coincident at all times after the apparatus has started operating at the user's station. To meet this requirement, it has been customary to provide the mechanical counter with a mechanism for resetting the counter to zero only once after the adjustment at the time of delivery. The mechanical counter is reset to zero at the same time as the electronic counter.

However, the mechanism for resetting the mechanical counter to zero is used only once. This not only wastefully sophisticates the configuration of the mechanical counter, but also increases the size and cost of the counter. Moreover, the mechanical counter and electronic counter cannot coincide with each other unless they are reset to zero at the same time by a complicated operation. Any error in the manual zero resetting operation would prevent the two counters from coinciding with each other.

Technologies relating to the present invention are disclosed in, e.g., Japanese Patent Publication Nos. 6-64637 and 8-28655 and Japanese Patent Laid-Open Publication Nos. 7-36320 and 10-91047.

SUMMARY OF THE INVENTION

It is therefore an object of the present invention to provide an image forming apparatus capable of maintaining the count of a mechanical counter and that of an electronic counter thereof coincident at all times by simple control.

In accordance with the present invention, an image forming apparatus includes an operation controller for controlling an image forming sequence including the feed of a recording medium, formation of an image on the recording medium, and discharge of the recording medium to the outside of the image forming apparatus. A mechanical counter and an electronic counter each count either consecutive image forming sequences executed or recording media sequentially driven out of the apparatus. A counter controller increments the count of the mechanical counter in accordance with the count of the electronic counter.

Also, in accordance with the present invention, an image forming apparatus includes an operation controller for controlling an image forming sequence including the feed of a recording medium, formation an image on the recording medium, and discharge of the recording medium to the outside of the image forming apparatus. A mechanical counter and an electronic counter each counts either consecutive image forming sequences executed or recording media sequentially driven out of the apparatus. A restoration processing section restores the count of the electronic counter to zero. A counter controller increments, after the restoration processing section has restored the count of the electronic counter to zero, the mechanical counter at the same time as it increments the electronic counter.

BRIEF DESCRIPTION OF THE DRAWINGS

The above and other objects, features and advantages of the present invention will become more apparent from the following detailed description taken with the accompanying drawings in which:

FIG. 4 is a flowchart showing a specific procedure particular to the illustrative embodiment for restoring an electronic counter to zero; and FIG. 5 is a flowchart showing another specific counter control procedure available with the illustrative embodiment.

DESCRIPTION OF THE PREFERRED EMBODIMENT

Figure 1:
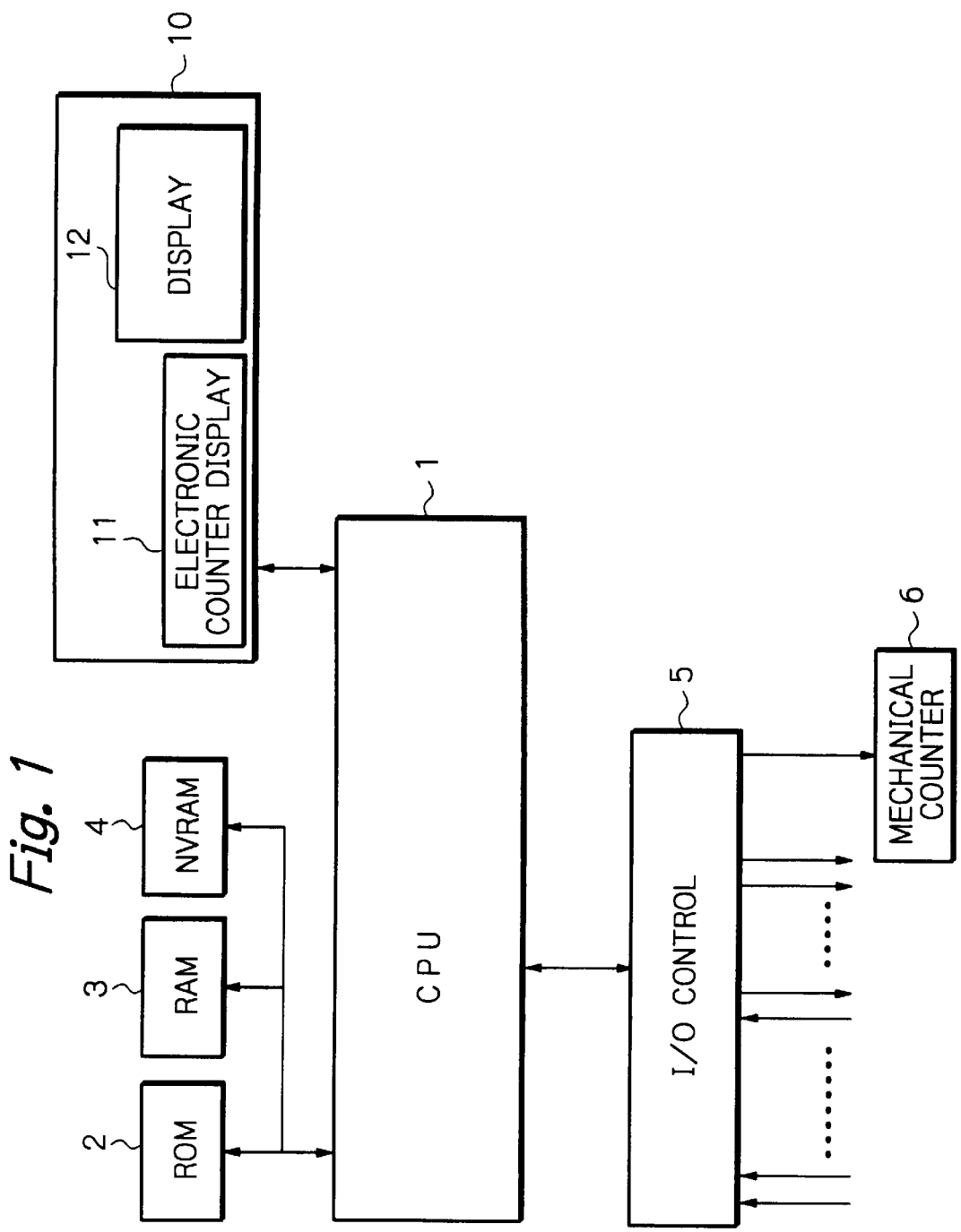
FIG. 1 is a block diagram schematically showing a control system included in an image forming apparatus embodying the present invention.

Referring to FIG. 1 of the drawings, a control system included in an image forming apparatus embodying the present invention is shown. As shown, the control system includes a microcomputer including a CPU (Central Processing Unit) 1, a ROM (Read Only Memory) 2, a RAM (Random Access Memory) 3, an NVRAM 4, and an I/O (Input/Output) control 5. A mechanical counter 6 and an operation panel 10 are connected to the I/O control 5 and CPU 1, respectively.

The CPU 1 controls the entire image forming apparatus in accordance with a control program stored in the ROM 2. Various fixed data are stored in the ROM 2 together with the control program. The RAM 3 plays the role of a work memory to be used by the CPU 1 for data processing. The NVRAM 4 serves as a memory for storing, e.g., the content of a mode or as an electronic counter. The I/O control 5 controls the interchange of signals between the CPU 1 and the mechanical counter 6 and motors, clutches and other loads not shown.

In the illustrative embodiment, the microcomputer including the CPU 1, ROM 2 and so forth plays the role of operation control means for controlling image formation.

The operation panel 10 includes an electronic counter display 11, various displays 12 including a character display, and key switches not shown. The electronic counter display 11 displays a count stored in the NVRAM or electronic counter 4.

A specific control procedure to be executed by the CPU 1 will be described hereinafter. In the specific procedure, the microcomputer including the CPU 1 and ROM 2 plays the role of counter control means. The CPU 1 controls an image forming sequence including the feed of a paper or similar recording medium, formation of an image on the paper, and the discharge of the paper with the image to the outside of the apparatus. In addition, the microcomputer controls the two different kinds of counters, e.g., mechanical counter 6 and electronic counter (NVRAM 4) for counting consecutive image forming sequences executed or papers with images driven out of the apparatus. The NVRAM or electronic counter 4 has a plurality of count data areas each being assigned to a particular counter.

Specifically, every time the image forming sequence is executed, a value stored in the count data area of the NVRAM 4 assigned to the number of times of image formation of that of papers is incremented by 1 (one). The resulting count of the above count data appears on the electronic counter display 11, so that the operator of the apparatus can see the count.

The mechanical counter 6 is incremented in accordance with the count of the electronic counter, as will be described in detail later. To increment the mechanical counter 6 by 1, a preselected electric signal is fed to the counter 6. More specifically, a current is caused to flow through a coil included in the mechanical counter 6, thereby causing an actuator to operate.

Figure 2:
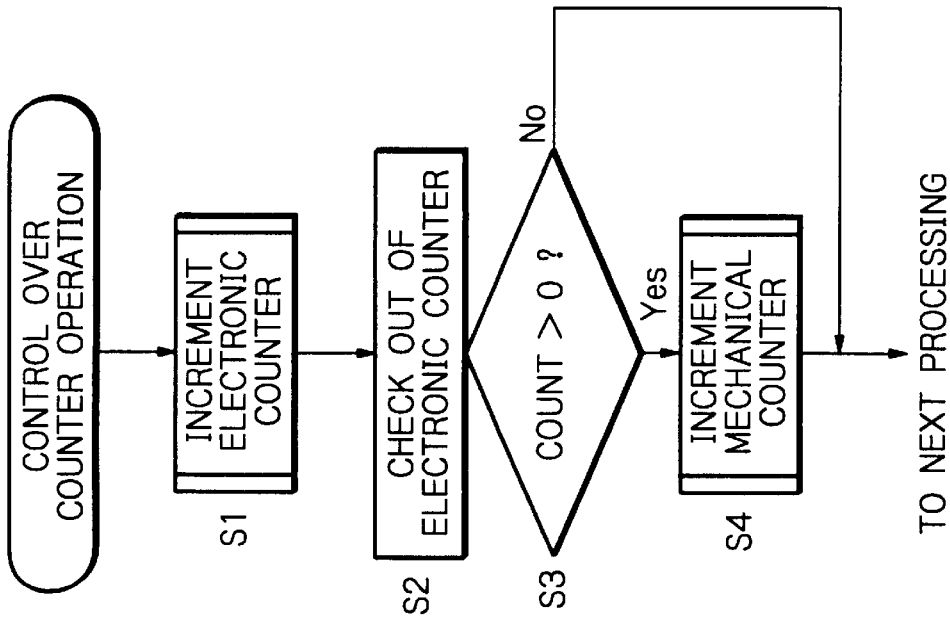
FIG. 2 is a flowchart demonstrating a specific counter control procedure of the illustrative embodiment.

FIG. 2 demonstrates a specific operation of the CPU 1 for controlling the electronic counter 4 and mechanical counter 6. Again, the microcomputer including the CPU 1 and ROM 2 serves as counter control means. As shown, every time the image forming sequence completes, the CPU 1 increments the electronic counter 4 by 1 (step S1) and then checks the count of the counter 4 (step S2). If the count of the electronic counter 4 is greater than a preselected value (Yes, step S3), the CPU 1 increments the mechanical counter 6 by 1 (step S4) at the same time as it increments the electronic counter 4. With such simple control, it is possible to cause the count of the mechanical counter 6 to coincide with the count of the electronic counter 4.

Figure 3:
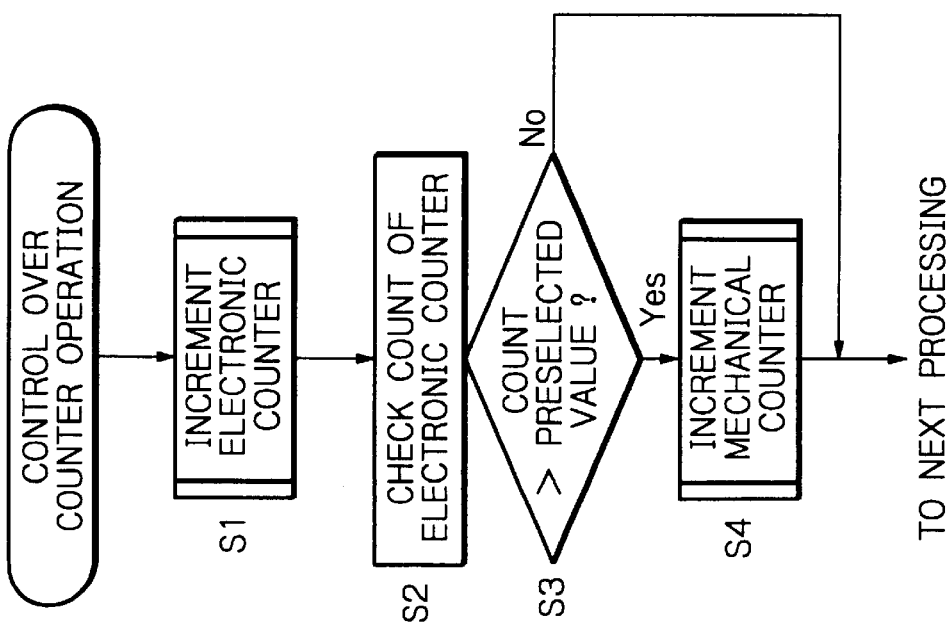
FIG. 3 is a flowchart showing another specific counter control procedure available with the illustrative embodiment.

FIG. 3 shows another specific operation of the CPU 1 for controlling the electronic counter 4 and mechanical counter 1. Again, the microcomputer including the CPU 1 and ROM 2 serves as counter control means. Steps S1 and S2 shown in FIG. 3 are identical with the steps S1 and S2 shown in FIG. 2 and will not be described in order to avoid redundancy. In FIG. 3, after the step S2, the CPU 1 determines whether or not the count of the electronic counter 4 is greater than zero (step S3). If the answer of the step S3 is Yes, the CPU 1 increments the mechanical counter 6 by 1 (step S4) at the same time as it increments the electronic counter 4.

Specifically, the count of the electronic counter 4 is smaller than zero before the counter 4 actually starts counting image forming sequences or papers with images at the user's station, i.e., during production, test and adjustment at the factory or during image forming operation executed for adjustment at the time of delivery. More specifically, a negative value of about −200 to about −2,000 is stored in the NVRAM 4 beforehand in the above condition. So long as the count of the electronic counter 4 is smaller than zero, it is not necessary to charge the user or to increment the mechanical counter 6. Therefore, when the apparatus is delivered from the factory, the count of the mechanical counter 6 and that of the electronic counter 4 are zero and a negative value, respectively.

For the above reason, the CPU 1 first increments only the electronic counter 4. After the count of the electronic counter 4 has reached zero, the CPU 1 increments the mechanical counter 6 in synchronism with the electronic counter 4 while causing the counter 6 to output a count signal.

As stated above, during production, test and adjustment at the factory or during adjustment at the time of delivery, the count of the electronic counter 4 is negative and causes the count of the mechanical counter 6 to remain zero. At the time of shipment from the factory, the count of the electronic counter is restored to zero by a preselected operation. Therefore, when the apparatus is actually used at the user's station for the first time, the CPU 1 can check the count of the electronic counter 4 and confirm that it is zero. The CPU 1 increments the mechanical counter 6 at the same time as it increments the electronic counter 4, thereby maintaining the counters 4 and 6 coincident at all times.

A specific operation of the CPU 1 for restoring the electronic counter 4 to zero will be described with reference to FIG. 4. In this specific operation, the microcomputer including the CPU 1 and ROM 2 plays the role of restoration processing means. As shown, when the keys arranged on the operation panel 10 are manually operated in a preselected manner for restoring the electronic counter 4 to zero, the CPU 1 determines whether or not a zero restoration flag assigned to the counter 4 is set (logical ONE) (step S1). If the flag is not set (logical ZERO) (No, STEP S1), the CPU 1 restores the electronic counter 4 to zero (step S2) and then sets the above flag (step S3).

The illustrative embodiment is arranged such that after the restoration of the electronic counter 4 to zero and the setting of the zero restoration flag, the flag cannot be cleared by any ordinary key input. It follows that even if the operation of the keys for restoring the electronic counter 4 to zero is performed later, the counter 4 does not return to zero.

FIG. 5 shows another specific operation of the CPU 1 for controlling the electronic counter 4 and mechanical counter 6. Again, the microcomputer including the CPU 1 and ROM 2 serves as counter control means. As shown, every time the image forming sequence completes, the CPU 1 increments the electronic counter 4 by 1 (step S1). Then, the CPU 1 checks the status of the zero restoration flag (step S2). If the flag is set (Yes, step S3), the CPU 1 increments the mechanical counter 6 also (step S4). If the answer of the step S3 is No, meaning that the above flag is not set, the CPU 1 does not increment the mechanical counter 6, determining that the apparatus is being dealt with at the factory or being adjusted at the time of delivery. More specifically, zero is initially set in the mechanical counter 6 and is maintained thereafter.

As stated above, at the time of delivery of the apparatus from the factory, the electronic counter 4 is restored to zero by a preselected manual operation, so that the zero restoration flag is set. Therefore, when the apparatus is used at the user's station for the first time, the CPU 1 can check the zero restoration flag and see that the electronic counter 4 is zero. So long as the flag is set, the CPU 1 increments the mechanical counter at the same time as it increments the electronic counter. This is also successful to maintain the two counters 4 and 6 coincident at all times.

In summary, it will be seventh the present invention provides an image forming apparatus capable of maintaining the count of an electronic counter and that of a mechanical counter coincident at all times by simple control. This makes it needless to provide the mechanical counter with a zero restoration mechanism and therefore reduces the size and cost of the mechanical counter. Further, a simple manual operation for resetting the electronic counter to zero suffices to maintain the two counters coincident without fail. In addition, the two counters are prevented from being brought out of coincidence to due erroneous manual operation.

Various modifications will become possible for those skilled in the art after receiving the teachings of the present disclosure without departing from the scope thereof.

What is claimed is:

1. An image forming apparatus comprising:

operation control means for controlling an image forming sequence including a feed of a recording medium, a formation of an image on said recording medium, and a discharge of said recording medium to an outside of said image forming apparatus;

a mechanical counter and an electronic counter each for counting either consecutive image forming sequences executed or recording media sequentially driven out of said image forming apparatus; and counter control means for incrementing a count of said mechanical counter in accordance with a count of said electronic counter.

2. An image forming apparatus as claimed in claim 1, wherein said counter control means starts incrementing said mechanical counter when the count of said electronic counter exceeds a preselected value.

3. An image forming apparatus as claimed in claim 1, wherein said counter control means starts incrementing said mechanical counter when the count of said electronic counter exceeds zero.

4. An image forming apparatus comprising:

operation control means for controlling an image forming sequence including a feed of a recording medium, a formation of an image on said recording medium, and a discharge of said recording medium to an outside of said image forming apparatus;

a mechanical counter and an electronic counter each for counting either consecutive image forming sequences executed or recording media sequentially driven out of said image forming apparatus;

restoration processing means for restoring the count of said electronic counter to zero; and counter control means for incrementing, after said restoration processing means has restored the count of said electronic counter to zero, said mechanical counter at the same time as said counter control means increments said electronic counter.

\* \* \* \* \*